United States Patent
BenHanokh et al.

(10) Patent No.: US 12,099,747 B2
(45) Date of Patent: Sep. 24, 2024

(54) MANAGING WRITE REMOVAL FOR SOLID-STATE DRIVES

(71) Applicant: Red Hat, Inc., Raleigh, NC (US)

(72) Inventors: Gabriel Zvi BenHanokh, Tel-Aviv (IL); Orit Wasserman, Mitzpe Aviv (IL)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/130,163

(22) Filed: Dec. 22, 2020

(65) Prior Publication Data

US 2022/0197553 A1 Jun. 23, 2022

(51) Int. Cl.
G06F 3/06 (2006.01)

(52) U.S. Cl.
CPC .......... *G06F 3/0659* (2013.01); *G06F 3/0626* (2013.01); *G06F 3/067* (2013.01); *G06F 3/0679* (2013.01); *G06F 2212/7205* (2013.01)

(58) Field of Classification Search
CPC ...... G06F 3/0659; G06F 3/0626; G06F 3/067; G06F 3/0679; G06F 2212/7205
See application file for complete search history.

(56) References Cited

U.S. PATENT DOCUMENTS

| | | | | |
|---|---|---|---|---|
| 7,845,005 | B2 * | 11/2010 | Kelley | G06F 21/565 |
| | | | | 713/193 |
| 8,458,011 | B2 | 6/2013 | Al-Dawsari et al. | |
| 9,240,025 | B1 | 1/2016 | Ward, Jr. et al. | |
| 10,002,026 | B1 * | 6/2018 | Wagner | G06F 9/45558 |
| 10,223,254 | B1 * | 3/2019 | Frolikov | G06F 3/061 |
| 10,789,089 | B2 | 9/2020 | Hari | |
| 10,832,169 | B2 | 11/2020 | Blue | |
| 2015/0205717 | A1 * | 7/2015 | Lin | G06F 3/0614 |
| | | | | 711/103 |
| 2018/0285156 | A1 * | 10/2018 | Corey | G06F 9/5005 |
| 2019/0391855 | A1 | 12/2019 | Bernat et al. | |
| 2021/0232419 | A1 * | 7/2021 | Mueller | G06F 9/45558 |

OTHER PUBLICATIONS

Kilczuk, Peter, Parallelize your docker-compose build, Jun. 4, 2019, Medium, https://medium.com/schkn/parallelize-your-docker-compose-build-8ac653e3e596 (Year: 2019).*
Cao, B., et al., "Dynamic Pricing for Resource Consumption in Cloud Service," Wireless Communications and Mobile Computing, 2018, https://www.hindawi.com/journals/wcmc/2018/4263831/.
Shaari, N.A.M., et al., "Dynamic Pricing Scheme for Resource Allocation in Multi-Cloud Environment," Malaysian Journal of Computer Science, 2017, https://www.researchgate.net/publication/316557107_Dynamic_Pricing_Scheme_for_Resource_Allocation_in_Multi-Cloud_Environment.

* cited by examiner

*Primary Examiner* — Kalpit Parikh
(74) *Attorney, Agent, or Firm* — Kilpatrick Townsend & Stockton LLP

(57) ABSTRACT

Write removal for solid-state drives can be managed. For example, a computing device can designate a space of a solid-state drive (SSD) for a write of container. The computing device can store the write for the container in the space in response to loading the container for executing the container. The computing device can determine an end to an execution phase for the container. In response to determining the end to the execution phase, the computing device can remove the write from the space of the SSD.

17 Claims, 3 Drawing Sheets

MANAGING WRITE REMOVAL FOR SOLID-STATE DRIVES

TECHNICAL FIELD

The present disclosure relates generally to storage devices for computing networks. More specifically, but not by way of limitation, this disclosure relates to managing write removal for solid-state drives.

BACKGROUND

Solid-state drives (SSDs) are a type of storage device for storing data. An SSD is organized into blocks, with each block including a number of pages made up of a row of cells. SSDs read and write data as pages, but erase data at the block level. Once a block is erased, new data can be written to the cells of the block. A block can be written and erased a predefined amount of time before the SSD fails. For example, a block may be limited to writing and erasing a block 1000 times.

DETAILED DESCRIPTION

Figure 1:
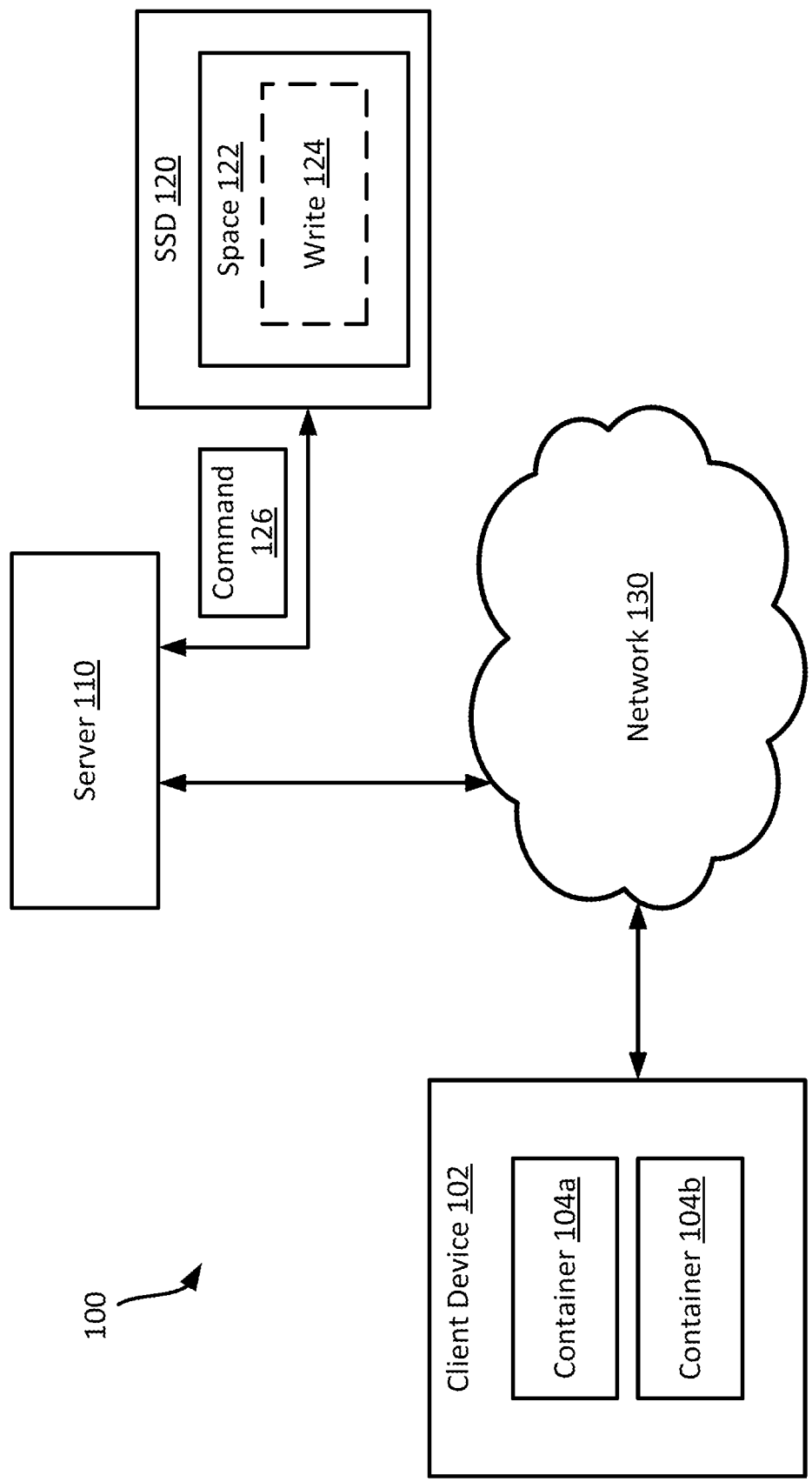
FIG. 1 is a block diagram of an example of a system for managing write removal for a solid-state drive according to some aspects of the present disclosure.

Writes of multiple containers can be stored in a solid-state drive (SSD). Writes are data objects, such as files, that are transferred from one location to another. For example, a write can be a transfer of a data object to an SSD. The writes are interleaved based on when they are received, so data from one container is not stored in a continuous space. When free space of the SSD is limited, the SSD can erase data associated with containers that have shut down and released their SSD space. However, SSDs erase data by block, so an entire block has to include released data before the SSD can erase the data. As a result, the SSD performs reads and writes to move unreleased data in the block to a different block. Reading is the process of obtaining the data from the block and writing is the operation of transferring the read data to the different block. The writes from moving data to the different block are referred to as write amplification, which increases overhead of the system. Overhead can be an increase in bandwidth, computation time, memory usage, or other resource usage, resulting in suboptimal performance of the system. Additionally, write amplification can reduce the lifespan of the SSD, since SSDs are limited in the number of times a block can be erased.

Some examples of the present disclosure can overcome one or more of the abovementioned problems by providing a system that can designate a space of an SSD for a write of one or more containers. The system can store the write for the one or more containers in the space in response to loading the one or more containers for executing the one or more containers. The system can synchronize loading and executing the one or more containers, so that the write is stored in the designated space. The system can determine an end to an execution phase. The execution phase can be a phase during which the one or more containers are activated and performing read and write operations or other processes. The end of the execution phase can be a shut down or deactivation of the one or more containers. In response to determining the end to the execution phase, the system can remove the write from the space of the SSD. The system can maintain the write in the space until the system determines each of the one or more containers is no longer in the execution phase. Since the write for the containers is removed entirely at once, write amplification can be reduced for the SSD.

One particular example can involve two containers writing to the same SSD. The system can determine the write for the two containers is expected to be 8 MB. As a result, the system can designated 8 MB of continuous space in the SSD to store the write. The system can then load the two containers and store the write in the designated space. The system can determine an end to an execution phase for both of the containers. In response to the end of the execution phase for both of the containers, the system can remove the write from the designated space of the SSD. The system can erase the space without moving data to other spaces in the SSD, thereby reducing write amplification for the SSD.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for managing write removal for a solid-state drive according to some aspects of the present disclosure. The system 100 can include a client device 102, a server 110, and a solid-state drive (SSD) 120. Examples of the client device 102 can include a desktop computer, a laptop, a mobile phone, etc. The client device 102 can communicate with the server 110 over a network 130, such as a local area network (LAN) or the Internet.

In some examples, the client device 102 can execute containers 104a-b. The client device 102 may execute the containers 104a-b individually or simultaneously. The server 110 can designate a space 122 of the SSD 120 to which a write 124 of one or more of the containers 104a-b is to be stored. If the client device 102 executes the containers 104a-b, the server 110 can designate the space 122 for the container 104a. A different space of the SSD 120 can be designated for the container 104b. To designate the space 122, the server 110 can determine an expected space requirement for the write 124 of each of the containers 104a-b. The server 110 can designate the space 122 as the same size as the expected space requirement. For example, the expected space requirement can be a number of blocks in the SSD 120. As one particular example, the server 110 can determine the write 124 for the containers 104a-b has an expected space requirement of 4 MB and designate the space 122 as 4 MB. The space 122 can be a continuous space of the SSD 120. Pre-allocating the space 122 can allow the write 124 to be released without write amplification. Although 4 MB is used in this example, the space may be any suitable size for a write of one or more containers.

In some examples, the SSD 120 can be a Zoned Namespace SSD. In such examples, the space 122 can be multiple zones that collectively satisfy the expected space requirement for the write 124. Each container can be designated to a different zone of the space 122 so that the data for each container is not interleaved. Alternatively, multiple containers may be designated to a zone, but the number of containers per zone can be minimized to reduce write amplification. The server 110 may determine the space 122 to be a number of zones high enough to allow writes to run in parallel, but low enough for the zones to be filled.

In some examples, the server 110 can load the containers 104a-b to be executed during an execution phase. During the execution phase, the server 110 can store the write 124 for the containers 104a-b to the space 122 after loading the containers 104a-b. The containers 104a-b can be a container group and the server 110 may coordinate the execution phase of the containers 104a-b so that the containers 104a-b are started and executed simultaneously. Alternatively, the server 110 may coordinate the execution phase of the containers 104a-b so that containers 104a-b are executed in succession to each other. While the containers 104a-b are in the execution phase, the server 110 can maintain the write 124 in the space 122. Maintaining the write 124 can ensure that portions of the data of the write 124 are not removed before an entirety of the write 124 can be removed.

The server 110 can monitor the containers 104a-b to determine when the execution phase for the containers 104a-b ends. The execution phase can end when the containers 104a-b shut down or are no longer performing operations. The server 110 can determine an end to the execution phase, and in response, remove the write 124 from the space 122 of the SSD 120. For example, the server 110 can determine the end of the execution phase and then transmit a command 126 to the SSD 120 indicating the write 124 is to be removed. The command 126 can be a trim command specifying the write 124 in the space 122 is to be removed. If the containers 104a-b are executed simultaneously, the server 110 can transmit the trim command subsequent to determining the end of the execution phase for all of the containers 104a-b. The SSD 120 can be configured to remove the write 124 from the space 122 in response to receiving the command 126. Removing the write 124 can free up the space 122 for additional writes without moving data to other spaces of the SSD 120. As a result, write amplification for the SSD 120 can be reduced.

It will be appreciated that FIG. 1 is intended to be illustrative and non-limiting. Other examples may include more components, fewer components, different components, or a different arrangement of the components shown in FIG. 1. For instance, although the system 100 includes two containers in the example of FIG. 1, the system 100 may coordinate a larger number of containers in other examples.

Figure 2:
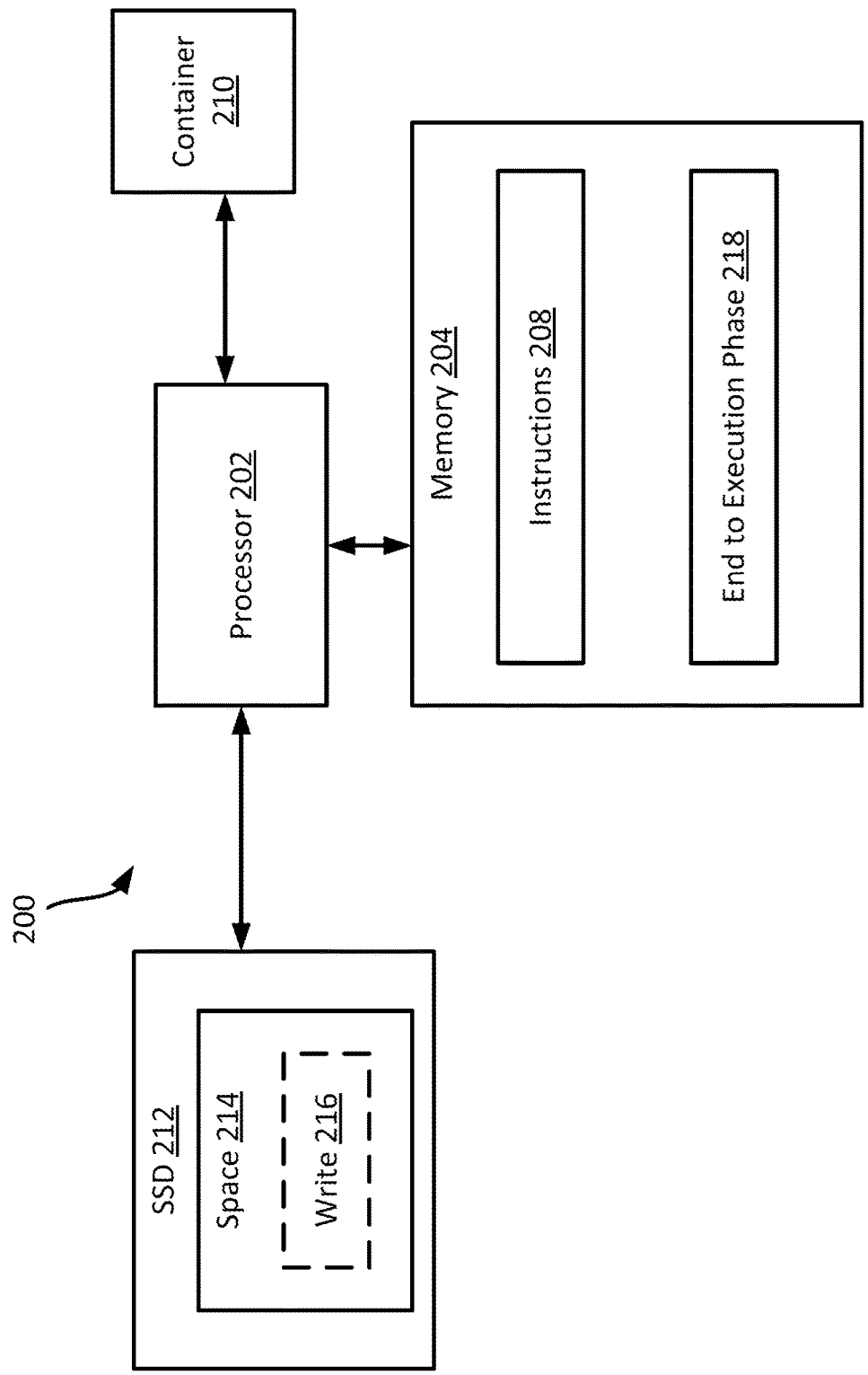
FIG. 2 is a block diagram of another example of a system for managing write removal for a solid-state drive according to some aspects of the present disclosure.

FIG. 2 is a block diagram of another example of a system 200 for managing write removal for a solid-state drive according to some aspects of the present disclosure. The system 200 includes a solid-state drive (SSD) 212 and a processor 202. The processor 202 may be part of a server, such as the server 110 in FIG. 1.

In this example, the processor 202 is communicatively coupled with a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 can execute the instructions 206 to perform operations. For example, the processor 202 can designate a space 214 of a SSD 212 for a write 216 of a container 210. The processor 202 can store the write 216 for the container 210 in the space 214 in response to loading the container 210 for executing the container 210. The processor 202 can determine an end to an execution phase for the container 210, and in response to determining the end to the execution phase 218, the processor 202 can remove the write 216 from the space 214 of the SSD 212.

In some examples, the processor can designate the space 214 for a plurality of containers. The processor 202 can synchronize loading and executing the plurality of containers, such that a write for each container is stored in the space 214. The processor 202 can determine the end of the execution phase for the plurality of containers and then remove the write 216 from the space. The processor 202 can synchronize the removal of the write 216, such that the entirety of the write 216 is removed simultaneously, as opposed to a write for a portion of the plurality of containers 210. The processor 202 can transmit a command to the SSD 212 indicating the write 216 is to be removed in response to determining the end of the execution phase for the plurality of containers.

Figure 3:
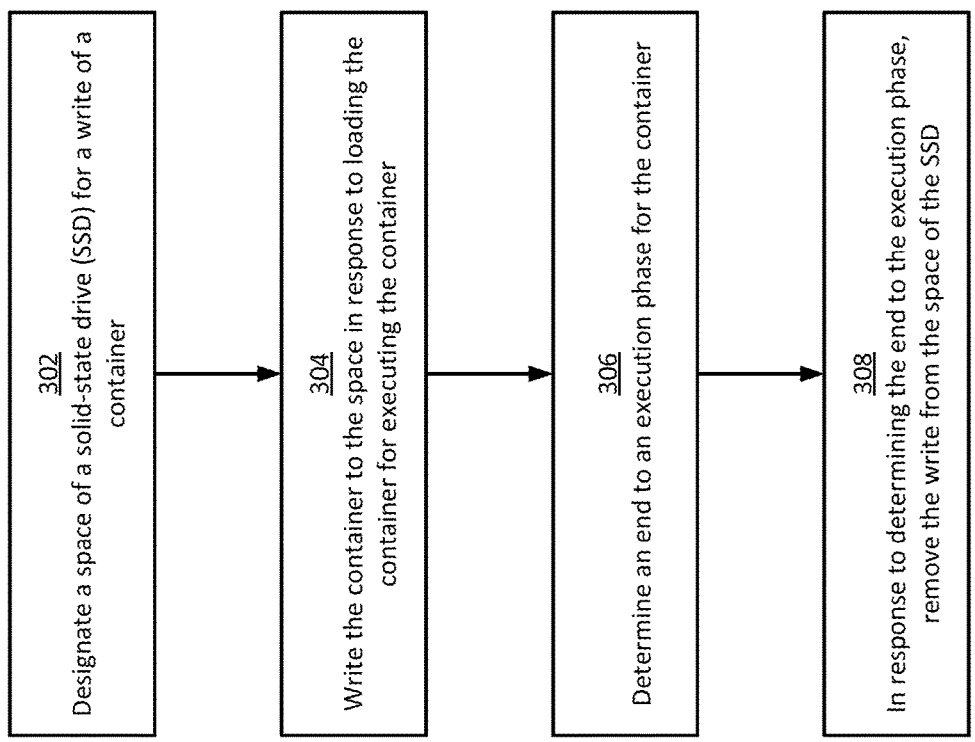
FIG. 3 is a flow chart of a process for managing write removal for a solid-state drive according to some aspects of the present disclosure.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 can designate a space 214 of an SSD 212 for a write 216 of a container 210. The processor 202 may determine an expected space requirement for the write 216 and designate the space 214 based on the expected space requirement. If the SSD 212 is a Zoned Namespace SSD, the processor 202 can designate the space 214 as a plurality of zones of the Zoned Namespace SSD.

In block 304, the processor 202 can store the write 216 for the container 210 in the space 214 in response to loading the container 210 for executing the container 210. In examples where the space 214 is designated for a plurality of containers, the processor 202 can synchronize loading and executing the plurality of containers 210.

In block 306, the processor 202 can determine an end to an execution phase 218 for the container 210. The processor 202 can determine that the container 210 has shut down or is no longer performing operations to determine the end to the execution phase 218. While the container 210 is in the execution phase, the processor 202 can maintain the write 216 in the space 214 of the SSD 212.

In block 308, the processor 202 can, in response to determining the end to the execution phase 218, remove the write 216 from the space 214 of the SSD 212. The processor 202 can transmit a command, such as a trim command, to the SSD 212 indicating the write 216 is to be removed. The SSD 212 can be configured to remove the write 216 in response to receiving the command. As a result, data for the container 210 can be removed from a continuous space of the SSD 212, therefore reducing write amplification for the SSD 212.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a memory including instructions that are executable by the processor for causing the processor to:
designate a space of a solid-state drive (SSD) for a write of a container and one or more additional containers, the space being a continuous space of the SSD that is different from another space of the SSD designated for another container;
synchronize a loading and an execution of the container and the one or more additional containers so that the loading and the execution of the container is simultaneous to the loading and the execution of the one or more additional containers;
store the write for the container and the one or more additional containers in the space in response to loading the container and the one or more additional containers for executing the container and the one or more additional containers;
maintain the write in the space of the SSD while at least one of the container and the one or more additional containers is in an execution phase;
determine an end to the execution phase for the container and the one or more additional containers; and
in response to determining the end to the execution phase, remove the write from the space of the SSD in an operation that excludes moving data of the write to other spaces of the SSD prior to removing the write.

2. The system of claim 1, wherein the memory further includes instructions that are executable by the processor for causing the processor to:
determine the container is in the execution phase; and
maintain the write in the space of the SSD.

3. The system of claim 1, wherein the memory further includes instructions that are executable by the processor for causing the processor to designate the space by:
determining an expected space requirement for the write of the container; and
designating the space based on the expected space requirement.

4. The system of claim 1, wherein the memory further includes instructions that are executable by the processor for causing the processor to remove the write from the space of the SSD by transmitting a command to the SSD indicating the write is to be removed.

5. The system of claim 4, wherein the command comprises a trim command.

6. The system of claim 1, wherein the SSD comprises a Zoned Namespace SSD and the space comprises a plurality of zones that collectively satisfy an expected space requirement for the write.

7. A computer-implemented method comprising:
designating a space of a solid-state drive (SSD) for a write of a container and one or more additional containers, the space being a continuous space of the SSD that is different from another space of the SSD designated for another container;
synchronizing a loading and an execution of the container and the one or more additional containers so that the loading and the execution of the container is simultaneous to the loading and the execution of the one or more additional containers;
storing the write for the container and the one or more additional containers in the space in response to loading the container and the one or more additional containers for executing the container and the one or more additional containers;
maintaining the write in the space of the SSD while at least one of the container and the one or more additional containers is in an execution phase;
determining an end to the execution phase for the container and the one or more additional containers; and
in response to determining the end to the execution phase, removing the write from the space of the SSD in an operation that excludes moving data of the write to other spaces of the SSD prior to removing the write.

8. The method of claim 7, further comprising:
determining the container is in the execution phase; and
maintaining the write in the space of the SSD.

9. The method of claim 7, wherein designating the space comprises:
determining an expected space requirement for the write of the container; and
designating the space based on the expected space requirement.

10. The method of claim 7, wherein removing the write from the space of the SSD comprises transmitting a command to the SSD indicating the write is to be removed.

11. The method of claim 10, wherein the command comprises a trim command.

12. The method of claim 7, wherein the SSD comprises a Zoned Namespace SSD and the space comprises a plurality of zones that collectively satisfy an expected space requirement for the write.

13. A non-transitory computer-readable medium comprising program code that is executable by a processor for causing the processor to:
designate a space of a solid-state drive (SSD) for a write of a container and one or more additional containers, the space being a continuous space of the SSD that is different from another space of the SSD designated for another container;
synchronize a loading and an execution of the container and the one or more additional containers so that the loading and the execution of the container is simultaneous to the loading and the execution of the one or more additional containers;
store the write for the container and the one or more additional containers in the space in response to loading the container and the one or more additional containers for executing the container and the one or more additional containers;

maintain the write in the space of the SSD while at least one of the container and the one or more additional containers is in an execution phase;

determine an end to the execution phase for the container and the one or more additional containers; and in response to determining the end to the execution phase, remove the write from the space of the SSD in an operation that excludes moving data of the write to other spaces of the SSD prior to removing the write.

14. The non-transitory computer-readable medium of claim 13, further comprising program code that is executable by the processor for causing the processor to:

determine the container is in the execution phase; and
maintain the write in the space of the SSD.

15. The non-transitory computer-readable medium of claim 13, further comprising program code that is executable by the processor for causing the processor to designate the space by:

determining an expected space requirement for the write of the container; and designating the space based on the expected space requirement.

16. The non-transitory computer-readable medium of claim 13, further comprising program code that is executable by the processor for causing the processor to remove the write from the space of the SSD by transmitting a command to the SSD indicating the write is to be removed.

17. The non-transitory computer-readable medium of claim 13, wherein the SSD comprises a Zoned Namespace SSD and the space comprises a plurality of zones that collectively satisfy an expected space requirement for the write.

* * * * *